3,322,702
PHENOLIC RESOLE-BONE GLUE-UREA-DILUENT EXTENDER BINDER COMPOSITION FOR BONDED MAT

Clayton A. Smucker and Joseph P. Stalego, Newark, Ohio, assignors to Owens-Corning Fiberglas Corporation, a corporation of Delaware
No Drawing. Filed Oct. 23, 1965, Ser. No. 504,172
5 Claims. (Cl. 260—7)

This invention relates to a binder composition which is especially adapted for use in connection with glass or other vitreous fibers in mat form, and, more particularly, to a hardenable, aqueous binder composition containing bone glue as a major component. Specifically, the invention relates to an aqueous binder composition containing a heat-hardenable phenolic resin, bone glue, urea and "Vinsol" and/or dimer acids.

Bonded mats and boards of intermeshed glass and other vitreous fibers have been extensively produced heretofore. Such bonded mats are produced in a number of different manners. Generally, random or uniform length fibers or strands, chopped or continuous length filaments or strands of a material, such as glass, or mixtures thereof, are produced in any of the well-known ways, such as by a continuous filament process, a rotary or centrifugal process, a steam or other fluid-blown process or the like, and the fibers, filaments, strands or mixtures thereof are collected as a tangled, intermeshed, web-like mass on a suitable collecting means such as a foraminous conveyor. The collected mass then is impregnated, such as by immersion, dipping, spraying, roll-coating or the like with a suitable hardenable binder which is subsequently cured and hardened, as by passing the impregnated mass through a heated oven. The curing and hardening can be carried out with the fibers compressed or compacted, if desired, and a board-like product of an apparent density as high as about 12 pounds per cubic foot can be produced, or, if no compression is applied during the curing or hardening, products of much lower density can be obtained. Various materials of this type have been produced and have found widespread use for protective purposes and as acoustical and thermal building insulation. In addition to the use of such materials as thermal and acoustical building and roofing insulation, the materials also find widespread utility as pipe and conduit wrappings for protective and insulating purposes.

The siliceous materials used as the basis of the thermal and acoustical insulation produced in accordance with the invention are those materials which are known in the art as "glass fibers" and such term is intended to encompass any fiber made from those materials defined in the ordinary usage of the art as glasses. In general, the glass fibers in commercial usage and which are particularly contemplated herein have a composition of approximately the following ranges: from about 50 percent to about 75 percent silica, up to about 15 percent boric oxide, from about 2 percent to about 25 percent alkaline earth metal oxides such as, for example, calcium oxide, magnesium oxide, barium oxide and strontium oxide, with the amount of calcium oxide normally being at least 50 percent of the alkaline earth metal oxide content, from about 0 percent to about 15 percent of alkali metal oxides, particularly sodium oxide, potassium oxide or both, up to about 10 percent titanium dioxide, and up to 1 percent iron oxide and from about 0 percent to about 3 percent of fluorine. Traces of other glass-forming ingredients and/or impurities such as manganese oxide, zirconium dioxide and zinc oxide may also be present. The fibers, of which the herein above-described products may be fabricated, may have a diameter ranging, depending on the ultimate use thereof, from a minimum of about 10 hundred-thousandths of an inch to about 70 hundred-thousandths of an inch, although the preferable diameter will fall between about 35 and 65 hundred-thousandths of an inch.

Binder formulations for such mat products generally are aqueous dispersions. Aqueous dispersions are quite desirable for economic reasons and ease of application. The production of a variety of products, which may range in apparent density and differ in other respects, is readily possible by control of the solids content of the aqueous dispersion and by control of the amount of dispersion applied to the fibrous mass.

The binder formulation contains a cementing constituent, generally resinous in nature, which, after application to the fibers and curing thereof, provides a suitable tackiness, degree of flexibility and rigidity, and structural stability in the fibrous mat. The cementing constituent serves to bond and lock fibers and filaments together at numerous junctions and intersections thereof. Particularly useful, and in widespread use as a cementing or bonding constituent, have been organic resins such as, for example, heat-hardenable phenolic resins, in particular, a resole of the phenol-formaldehyde type. Such a resole is readily dispersed or dissolved in water, can be easily and efficiently applied to the fibrous mass, and is cured readily by heating, which also drives off the water, and produces a bonded mat of satisfactory strength and structural stability. In addition to the cementing or binding agent, such aqueous binding formulations generally contain a number of other constituents to impart desirable properties to the bonded mat. These other constituents may or may not be present, but generally are included for purposes well known in the art. For example, a binder formulation may contain such constituents as plasticizers, fillers, coupling agents, sizing agents, lubricants, tackifiers and the like.

Particularly desirable binder compositions for the production of building and roofing insulation and the like are those compositions which, after hardening or cure thereof, impart sufficient structural integrity to the bonded mat that a degree of bending to match various contours is possible, while the mat still retains a substantially permanent structure. The inclusion of large amounts of a rigid or inflexible binder within a bonded mat may cause the mat to fracture or fragment upon being bent. Generally, the binder formulation includes a plasticizer or diluent for the cementing constituent to eliminate such difficulties. Another desirable property for bonded mat is an absence of excessive dusting or "fly." A "level of fly" for a bonded mat is the tendency of short fiber lengths, loose ends of fibers, and broken fibers and filaments to project and to dust off and break away from the bonded mat. For convenient handling and to avoid resistance or reluctance of workers to handle the mat, it is desirable that this "level of fly" be extremely low. The "level of fly" can be minimized by the use of a cured binder of a suitable tackiness. Such a suitable tackiness serves to entrap and hold loose material which would otherwise increase fly. The tackiness of the binder, however, should be sufficiently low that the bonded mat does not have an excessively tacky feel when handled.

The present invention is based upon the discovery of a binder composition for use with glass or other vitreous fibers in bonded mat structures, which composition provides a mat of excellent structural integrity having a low level of fly without sacrifice of strength and other properties of the mat. The binder composition per se is relatively stable after preparation thereof before use, being more stable, for example, than a conventionally employed furfuryl alcohol-type binder.

It is, therefore, an object of the invention to provide an improved binder composition for bonded fibrous mat and the like.

It is another object of the invention to provide a method for preparing an improved binder composition.

It is still another object of the invention to provide an improved bonded fibrous mat containing the binder composition of the invention in a cured or hardened state.

It is a further object of the invention to provide a hardenable binder composition which essentially comprises bone glue as a major ingredient, "Vinsol" and/or polymerized fatty acids, a hardenable phenolic resin and urea.

Other objects and advantages will be apparent from the description which follows, which is intended only to illustrate and to disclose, and in no way to limit the invention.

THE INVENTION

According to the invention, there is provided an improved binder composition for bonding fibrous mat. Such composition, in an aqueous formulation, has a solids content from about 5 percent* to about 35 percent, and preferably from about 12 percent to about 22 percent. The solids of a particularly useful binder composition consist essentially of about 53 percent bone glue, about 35 percent of a heat-hardenable phenol-formaldehyde resin, about 3 percent "Vinsol" or polymerized fatty acids and about 5 percent to about 15 percent urea. Preferably, the solids consist essentially of from about 20 percent to 35 percent of a heat-hardenable phenol-formaldehyde resin, about 3 percent to 30 percent of a diluent-extender such as "Vinsol" and/or polymerized fatty acids, from 35 percent to 57 percent bone glue and from 5 percent to 15 percent urea. At least some of each of the above-described essential constituents must be included in the fibrous mat binder composition in order to achieve the desired results.

REACTANTS AND REACTANT CONDITIONS

The diluent-extenders which are used in the formulation of the invention are "Vinsol" or polymerized fatty acids (i.e., dimer acids) or a combination thereof.

"Vinsol" is a commercially available pinewood pitch extract which is a product of the production of wood rosin from pinewood. The pinewood is usually first steamed to remove volatile oils, such as turpentine and pine oil, and then extracted with a solvent such as gasoline. The extract is then distilled to remove the solvent and the volatile oils of the latter which were not first recovered by steaming. The residue after distillation is treated to remove refined rosin. The remaining residue is the extracted pinewood pitch which is used as the diluent-extender for the phenolic resole of the binder composition. The pitch comprises oxidized resin acid, oxidized abietic acid, oxidized terpenes, polyphenols, polymerized terpenes and usually ligneous matter. The physical properties of this pinewood pitch are well known and, for present purposes, it will suffice to add that it is a thermoplastic natural resin which is soluble in alcohols.

The polymerized fatty acids (i.e., dimer acids) in the aqueous binder composition also serve as a diluent extender and further function as a plasticizer. By varying the

*The terms "percent" and "parts" are used herein, and in the appended claims, to refer to percent and parts by weight, unless otherwise indicated.

amount of the polymerized fatty acid, the extent of cure of the binder composition, or both, it is possible to control and vary the tackiness and flexibility of the cured composition over wide ranges. Polymerized fatty acids are essentially the dimer and trimer fatty acids resulting from the polymerization, usually dimerization or trimerization, of unsaturated natural and synthetic fatty acids. The conventionally polymerized unsaturated fatty acids are the unsaturated fatty acids having a chain length of from about 10 to 22 carbon atoms, those having a chain length of 16 to 18 carbon atoms generally being preferred. Particularly useful are oleic, palmitic, linoleic, linolenic and various mixtures of such unsaturated acids, particularly mixtures of palmitic and oleic acids. One method of preparation of the polymerized fatty acids is to heat the unsaturated fatty acids under pressure in the presence of steam. As a result of such treatment, linkages, mainly located at the points of unsaturation in the acid molecules, are formed between two, or among three or more, molecules of the fatty acids to produce the dimers, trimers and higher polymers. Generally, unsaturated natural fatty acids are used to produce the polymerized fatty acid diluent-extenders of the binder composition. These unsaturated fatty acids usually are a mixture of two or more acids and the resulting polymerized fatty acids are mixed polymerized fatty acids, preponderantly mixed fatty acid dimers and trimers, with only a relatively small amount of unreacted fatty acid or higher polymer being present. Such mixtures of mixed polymerized fatty acids are satisfactory as suitable constituents, as well as those polymerized unsaturated fatty acids derived from a single unsaturated fatty acid. The specific dimer acid used in the binder of the present invention consists essentially of a mixture of about 71 percent of a 36-carbon, dibasic acid, about 26 percent of a 54-carbon, tribasic acid, and about 3 percent of an 18-carbon, monobasic acid, resulting from the polymerization or dimerization of naturally occurring 18-carbon, unsaturated fatty acids. The naturally occurring 18-carbon, unsaturated fatty acids are a commercially available mixture consisting essentially of a major amount of oleic acid and minor amounts of other 18-carbon unsaturated fatty acids, such as linoleic and linolenic acids, the mixture being derived from natural fats and oils. This commercially available mixture was subjected to a conventional heat-treatment under pressure in the presence of steam to yield the dimer acid. The dimer acid is a liquid, quite viscous in nature, which has a viscosity at 25° C. of about 10,000 centistokes and at 100° C. of 80 centistokes. The dimer acid is relatively insoluble in water, but is soluble in alcohol, ether, benzene, acetone, and naptha. Other properties of the dimer acid are:

Specific gravity at 15.5° C./15.5° C. 0.95.
Flash point, ° F. _____ 530.
Acid value (Mg. KOH per gram) __ 186–194.
Unsaponifiable _____ less than 2.0 percent.
Color, Gardner _____ less than 11.
Neutralization equivalent _____ 289–300.
Ash content _____ less than 0.1 percent.

Such a dimer acid also is commercially available under the name of "Empol 1022" polymerized fatty acid.

The major ingredient of the binder composition is bone glue. The bone glue acts as a dispersing agent for the "Vinsol" or dimer acids in the aqueous formulation and also functions as a diluent-extender for the phenolic resin. The inclusion of bone glue in the binder composition of the formulation of the invention contributes added strength to the bonded mat since the amino and carboxyl groups of the bone glue are reactive with the phenolic resole during the cure of the latter. Prior to cure, the amino groups are reactive with the carboxyl groups of the "Vinsol" or polymerized fatty acids. As a consequence of this reactivity, the bone glue is chemically combined with the final mat binder and chemically combines the polymerized fatty acids therewith.

The phenolic resole may be any of the customary resoles employed in aqueous binder compositions. Such resoles are from the group consisting of phenol-formaldehyde partial condensation products and phenol-amino-compound-formaldehyde partial condensation products. Such phenolic resoles are known to the art. These resoles preferably have a comparatively high water tolerance as it is frequently desirable to employ a relatively dilute aqueous binder formulation. As is stated above, the resoles contemplated herein are well-known in the art, such resoles being formed by the partial condensation of phenol with an excess of an aldehyde in alkaline solution. The phenolic resoles are known and a detailed discussion of same can be found in The Chemistry of Phenolic Resins, Robert W. Martin, John Wiley and Sons, Inc., New York, New York, 1956. In general, the resoles may consist of phenol-aldehyde condensation products which may be used alone or in admixture with other hardenable resin systems. The specific heat-hardenable phenolic resin, used in the preparation of thermal and acoustical insulation products according to the invention are not, however, part of the invention per se and their identity is therefore of only incidental importance. In most instances, the phenol-aldehyde type of phenolic resin is prepared by the condensation of phenol with formaldehyde, although any phenol and any aldehyde which will condense to form a heat-hardenable resole-type partial condensation product is suitable. Thus in lieu of formaldehyde, there may be substituted para-formaldehyde, furfuryl, acetaldehyde, metaldehyde, tetraldehyde and the like. In place of phenol (i.e. monohydroxybenzene) there may be used equivalent compounds such as resorcinol, xylenols, the cresols and similar compounds. In addition, where the preparation of a phenol-amino compound-aldehyde condensation product is indicated, the resole may be condensed with such amino compounds as melamine, urea, thiourea, dicyandiamide, biurea, guanidine and similar materials.

In addition to the above-described components of the binder formulation, urea is added to increase the ease of formulation of the composition and also to act as a formaldehyde scavenger in the final product. The inclusion of urea in the instant formulation therefore results in a product which is less likely to give off malodorous formaldehyde fumes and contributes to the stability of the resinous component of the binder composition.

The following example is presented solely for the purpose of illustrating and disclosing the invention:

About 275 gallons of a binder composition containing about 18 percent solids were prepared in a suitable mixing tank which was provided with a propeller-type agitator. In the binder preparation, the constituents listed below were added, in the amounts and in the order listed, with constant agitation and thorough mixing after addition of each constituent before addition of the next.

Ingredients: Amount
Water (at temperature of about 100° F.) _____ 1248 lbs. (150 gal.).
Bone glue _____ 250 lbs.
Urea _____ 40 lbs.
Ammonium hydroxide ___ 4 gals.
Phenolic resole _____ 360 lbs. (about 34 gal.).
"Vinsol" dispersion in water, 39½ percent solids _____ 31 lbs. (about 3½ gal.).

The period of agitation after addition of the bone glue and urea was about 1½ hours before the ammonium hydroxide, resin and "Vinsol" were added.

In place of the bone glue, polymerized fatty acids can be used and in lieu of urea, such equivalent compounds as dicyandiamide, melamine, biurea, etc. may be used.

The ammonium hydroxide is used to control the pH of the emulsion in the broad range of from about 7 to 8.5 and preferably from about 7.4 to 7.5. In the absence of urea or equivalent material, the binder will gel as the ammonium hydroxide is added.

The particular phenolic resole used was the partial condensation product of phenol and formaldehyde catalyzed with barium hydroxide and neutralized with sulfuric acid. Such a resole may be prepared by charging a suitable reactor with 50 parts of phenol, 90 parts of a formalin solution containing a 45 percent concentration of formaldehyde and 3 parts of barium hydrate. The starting materials are mixed and heated while being constantly stirred by a propeller-type agitator. The charge is initially heated to 110° F. and maintained at that temperature for 3 hours, at which time the temperature is then raised to 140° F. and maintained at that level for an additional 4 hours. Reaction is complete after a final cooking period of 1 hour at about 160° F. The reaction mixture is then cooled to 100° F. and neutralized, with dilute sulfuric acid, to a pH of about 7.2. The final product is then diluted with water to a desired solids content of about 65 percent.

Bonded mats of glass fibers and the like were prepared using the hardenable binder composition produced as described above. Some mats were prepared shortly after preparation of the binder composition was completed and others after the composition had been stored under ambient conditions for periods in excess of 10 days. Although there was no change in the appearance of the hardenable binder composition from such storage, the composition was stirred and agitated at least for a few minutes before use.

One method of the preparation of the bonded mat was as follows: steam blown glass fiber monofilaments were produced and co-deposited with water on a moving foraminous conveyor by conventional means. The resulting intermeshed mat-like mass in a thickness suitable for roofing insulation was impregnated with the binder composition of Example 1 by flowing the composition onto the upper surface of the mat and applying vacuum to the undersurface of the mat to withdraw water and some binder therefrom. The mat was then placed in a curing oven and subjected to a temperature of about 400° F. for 4 minutes to cure the associated binder. The bonded mat was found to have excellent structural integrity and a very low level of fly.

It will be apparent that various changes and modifications can be made from the specific details set forth herein without departing from the spirit and scope of the invention as defined in the appended claims.

What we claim is:

1. A hardenable, aqueous binder composition containing from 5 to 35 percent solids consisting essentially of from 20 to 30 percent of a heat-hardenable phenolic resole, 3 to 30 percent of a diluent extender selected from the group consisting of extracted pinewood pitch and polymerized unsaturated fatty acids having a chain length of from about 10 to 22 carbon atoms, from 35 to 57 percent bone glue and from 5 to 15 percent urea, said composition having a pH ranging from about 7 to 8.5.

2. A siliceous fiber mat structure wherein fibers of the structure are bonded to one another at points of contact by the composition of claim 1 in a hardened, cured state.

3. A hardenable, aqueous binder composition for fibrous structures, which composition contains from 12 to 22 percent solids consisting essentially of from 25 to 35 percent of a heat-hardenable phenol-formaldehyde resole, from 2 to 5 percent of a diluent-extender selected from the group consisting of extracted pinewood pitch and dimer acids having a chain length of from about 10 to 22 carbon atoms, from 45 to 53 percent of bone glue and from 5 to 10 percent of urea, said composition having a pH ranging from about 7.4 to 7.5.

4. A siliceous fiber mat structure wherein fibers of the structure are bonded to one another at points of contact by the composition of claim 3 in a hardened, cured state.

5. A method for preparing a hardenable binder composition comprising dissolving in water, bone glue, and urea, dispersing in the resulting solution, with agitation, polymers of unsaturated fatty acids having a chain length of from about 10 to 22 carbon atoms and mixing with the resulting dispersion a heat-hardenable phenolic resole and sufficient ammonium hydroxide to maintain the pH of the dispersion from about 7 to about 8.5, and wherein the proportions of the several ingredients are such that the binder composition has a solids content of from 12 percent to 35 percent and the solids consist essentially of from 35 percent to 57 percent of bone glue, from 5 to 15 percent urea, from 20 percent to 35 percent phenolic resole and from 3 percent to 30 percent of a diluent-extender selected from the group consisting of extracted pinewood pitch and polymerized unsaturated fatty acids having a chain length of from about 10 to 22 carbon atoms and combinations thereof.

References Cited

UNITED STATES PATENTS

| | | | |
|---|---|---|---|
| 2,389,183 | 11/1945 | Cone | 260—7 |
| 2,454,730 | 11/1948 | Bakonyi | 260—6 |
| 2,758,101 | 8/1956 | Shappell | 260—25 |

FOREIGN PATENTS

| | | |
|---|---|---|
| 293,232 | 7/1928 | Great Britain. |

WILLIAM H. SHORT, *Primary Examiner.*

E. M. WOODBERRY, *Assistant Examiner.*